Oct. 1, 1963    M. J. CORBETT    3,105,352
THRUST CONTROL FOR ROCKET ENGINES
Original Filed Jan. 2, 1959

INVENTOR.
Marshall J. Corbett
BY
Hill, Sherman, Meroni, Gross & Simpson
ATTORNEYS

United States Patent Office 3,105,352
Patented Oct. 1, 1963

3,105,352
THRUST CONTROL FOR ROCKET ENGINES
Marshall J. Corbett, Cleveland, Ohio, assignor to Thompson Ramo Wooldridge Inc., Cleveland, Ohio, a corporation of Ohio
Original application Jan. 2, 1959, Ser. No. 784,624, now Patent No. 3,067,574, dated Dec. 11, 1962. Divided and this application Nov. 6, 1961, Ser. No. 161,757
8 Claims. (Cl. 60—35.6)

This application is a division of application Serial No. 784,624, filed January 2, 1959, now Patent No. 3,067,574 issued December 11, 1962.

This invention relates to apparatus for controlling the thrust of a rocket engine of the type having a combustion chamber and an exhaust nozzle through which gases of combustion of a fuel consumed in the combustion chamber are released to provide thrust for the rocket. More particularly, this invention relates to apparatus for controlling the thrust of such a rocket adapted to burn a gelatinous material as a mono-propellant fuel.

In rocket engines of the type adapted to burn a gelatinous mono-propellant fuel which is extruded from a fuel storage tank directly into a combustion chamber, there is a tendency for the back pressures developed by the combustion of the fuel in the combustion chamber to interfere with the control of the rate of feed of the fuel into the combustion chamber. It is desirable that this rate of fuel feed be precisely controlled as a means of controlling the thrust of the rocket.

It is accordingly an object of the present invention to provide apparatus for controlling the thrust of a rocket engine of the type having a combustion chamber and an exhaust nozzle by controlling the rate of fuel feed to the combustion chamber independently of any back pressures built up in the combustion chamber.

It is a further object of this invention to provide such control apparatus particularly adapted for controlling the feed rate of a gelatinous mono-propellant fuel to a combustion chamber in response to a comparison of the actual pressure in the combustion chamber with a predetermined desired combustion chamber pressure.

It is a further object of this invention to provide such apparatus, the operation of which may readily be initiated in response to a remote command.

It is a further object of this invention to provide such apparatus which is light in weight, inherently simple and fool-proof, and yet efficient in operation.

Other objects, features, and advantages of the present invention will be more fully apparent to those skilled in the art from the following detailed description taken in connection with the accompanying drawings in which like reference characters refer to like parts throughout and wherein.

Figure 1:
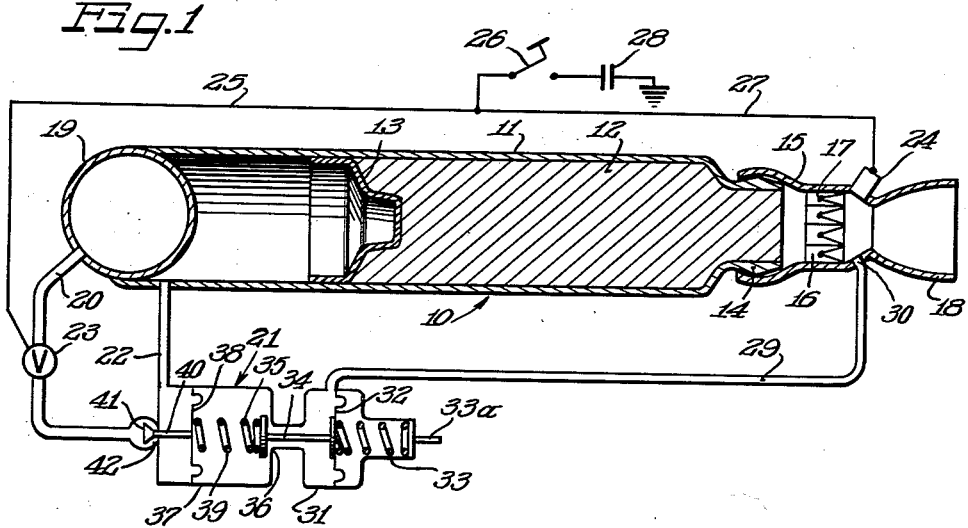
FIGURE 1 is a diagrammatic partially sectional view of a thrust control system in accordance with a first embodiment of the invention.

Rocket engines have, in the past, commonly been fueled by liquid or solid mono-propellants. More recently, gelatin mono-propellants have been developed which combine many of the advantages and eliminate many of the disadvantages of both solid and liquid propellants. Such gelatin mono-propellant fuels are extrudible plastic viscous slurrys or gelatinous materials. Numerous suitable mono-propellant mixtures can be made into this form.

Such mixtures preferably comprise a stable dispersion of a finely divided insoluble solid oxidizer in a continuous matrix of an oxidizable liquid fuel. The liquid fuel can be any oxidizable liquid, preferably an organic liquid containing carbon and hydrogen. Such liquid fuels include hydrocarbons such as triethyl, benzine, dodecane and the like; compounds containing oxygen linked to a carbon atom such as esters including methyl maleate, diethyl phthalate, butyl oxalate, and the like; alcohols such as benzyl alcohol, triethylene glycol and the like; ethers such as methyl o-naphthyl ether and the like, and many others.

The solid oxidizer can be any suitable active oxidizing agent which yields an oxidizing element such as oxygen, chlorine, or fluorine readily for combustion of the fuel and which is insoluble in the liquid fuel vehicle. Such oxidizers include inorganic oxidizing salts such as ammonia, sodium and potassium perchlorate or nitrate and metal peroxides such as barium peroxide.

Finely divided solid metal powders, such as aluminum or magnesium, may be incorporated in the mono-propellant composition as an additional fuel component along with the liquid fuel. Such metal powders possess the advantages both of increasing the fuel density and improving the specific impulse of the mono-propellant because of their high heats of combustion.

Gelling agents for imparting desired cohesiveness and flow characteristics to the plastic mixture include natural and synthetic polymers such as polyvinyl chloride, polyvinyl acetate, cellulose esters such as cellulose acetate, cellulose ethers such as ethyl cellulose, metal salts of higher fatty acids such as the sodium or magnesium stearates and palmitates.

The amount of oxidizer is preferably at a stoichiometric level with respect to the liquid fuel, although minimum concentrations of solid oxidizer as low as 40% by weight are operative. In general, the oxidizer will constitute about 65% by weight of the mixture. A preferred operative gelatinous mono-propellant includes a gel composed of up to 50% by weight of a liquid fuel, from 40% to 65% by weight of an oxidizer and from 3% to 10% of a gelling agent. A specific operative fuel can be composed of about 50% by weight of solid oxidizers such as potassium perchlorate, about 45% by weight of liquid fuels such as triethyl benzine, and about 5% by weight of a gelling agent such as ethyl cellulose. It is to be understood, however, that this invention is not limited to use with any particular gelatinous mono-propellant mixture, but rather is directed to apparatus for controlling the thrust of a rocket engine of the type adapted to burn such a mono-propellant fuel after it has been extruded into a combustion chamber in order to control the thrust of the rocket developed by discharge of the gases of combustion through an exhaust nozzle leading from the combustion chamber.

Turning now to the drawings, there is shown in FIGURE 1 a partly sectional diagrammatic view of a control system for a rocket engine 10 of the type adapted to controllably burn such a gelatinous mono-propellant fuel. The engine 10 includes a fuel tank 11 in which the gelatinous mono-propellant fuel 12 is stored. A drive means such as the plunger or piston 13 is mounted for sealed slidable motion in the fuel tank 11 in order to extrude the fuel 12 from the outlet end 14 of the fuel tank. Mounted on and in open communication with the outlet end 14 of the fuel tank is a combustion chamber 15 which preferably has a plurality of burner tubes 16 therein. Each of the burner tubes 16 also preferably includes a fuel splitting device 17 which in practice may be a conical plug mounted on a spider or a wire extending across the burner tube 16. Gases generated in the combustion chamber 15 are vented through an exhaust nozzle 18 which may be unitarily attached to the combustion chamber. Of course, the venting of the exhaust gases provides the thrust of the rocket engine.

The plunger 13 may, as shown in FIGURE 1, be driven by an inert gas admitted under controlled pressure in back of the plunger to urge the plunger toward the outlet end 14 of the fuel tank 11. As shown in FIGURE 1, the inert gas used may, for example, be nitrogen stored in a tank 19 forming the forward end wall of the fuel tank 11. Tank 19 is connected through a conduit or line 20 to a pressure regulator 21 and thence through conduit 22 to enter the fuel tank at a point in back of the plunger 13. Interposed in the conduit 20 is a cartridge fired shut-off valve 23 which in storage and ground handling is normally in the closed position. Shut-off valve 23 may be controlled by a common electrical circuit which also controls an igniter 24 mounted in the combustion chamber 15. Igniter 24 may be of any well-known type such as an electrically fired squib or a hot wire variety. Cartridge fired shut-off valve 23 is connected by a wire 25 to a switch 26. Igniter 24 is also connected to switch 26 by a wire 27. The switch in turn is connected when in the closed position to a charged capacitor 27 or to any other suitable source of electrical signal such as a battery or power supply. The other side of the source 27 is grounded and, of course, the other terminals of igniter 24 and cartridge fired valve 23 would also be grounded. When switch 26 is closed, an electrical signal is simultaneously applied to the cartridge fired shut-off valve 23 and to the igniter 24. This simultaneously opens the shut-off valve 23 and actuates the igniter 24. Opening of shut-off valve 23 admits nitrogen under pressure in back of plunger 13 thereby driving it toward the combustion chamber 15 and hence extruding fuel through the burner tubes 16 which is ignited by the igniter 24 to start the operation of the rocket engine.

As noted above, the thrust produced by the rocket engine is a function of the combustion chamber pressure which in turn is a function of the burning rate of the fuel, which in turn is a function of the rate at which the fuel is extruded to the combustion chamber. In order to maintain the thrust at a preselected desired value, a conduit or line 29 is connected through an orifice 30 to be in open communication with the combustion chamber 15. The other end of line 29 is in open communication with one side of a thrust regulator actuating chamber 31 having a centrally positioned diaphragm 32 therein. An adjustable calibrated spring 33 urges the diaphragm 32 to the left as seen in FIGURE 1, whereas the combustion chamber gas pressure as applied through line 29 to the chamber 31 urges the diaphragm 32 to the right as seen in FIGURE 1. Mounted on diaphragm 32 is a valve stem 34 and a valve 35 which may seat on a valve seat 36 at the inlet to the primary chamber 37 of the thrust regulator 21. A second diaphragm member 38 is positioned to divide the chamber 37 into two portions. A spring 39 is connected between valve 36 and one side of the diaphragm 38. A valve stem 40 carrying a valve 41 is connected to the other side of the diaphragm 38. Valve 41 is positioned to cooperate with a valve seat 42 at the inlet to chamber 37 from the nitrogen line 20 at the point where it enters the thrust regulator 21.

In operation, the adjustable calibrated spring 33 is set for a desired value of thrust as by adjustment of the position of a plunger 33a bearing against spring 33. This loads the spring 33, diaphragm 32, valve stem 34, spring 39, and diaphragm 38 and valve stem 40 to open the nitrogen valve 41 so as to admit nitrogen under pressure through line 22 to actuate the drive piston 13 thereby causing the extrusion of fuel 12 into the comubustion chamber 15. Burning of the fuel in the combustion chamber builds up pressure therein which is communicated through line 29 to act on the diaphragm 32 and urge it toward the right in FIGURE 1 thereby tending to urge the valve 41 towards its closed position to reduce the pressure of the nitrogen being supplied through line 22 and thereby reduce the rate of fuel extrusion. When the desired value of rocket thrust has been achieved, as indicated by the desired value of combustion chamber pressure, the pressure acting on the left side of diaphragm 32 is equal to the pressure applied to the right side of the diaphragm by spring 33 and the diaphragm 32 is in equilibrium. In this equilibrium position, the valve 41 is positioned to maintain a nitrogen pressure sufficient to produce a rate of fuel extrusion which will just maintain the desired thrust. However, it will be apparent that the pressure in nitrogen tank 19 itself falls as more and more nitrogen is used during the course of the rocket's travel. By way of example, the initial pressure of the nitrogen may be 2,000 p.s.i. and the final pressure at the end of expulsion may be as low as 400 p.s.i. Such pressures may be used, for example, where it is desired to maintain a combustion chamber pressure in the neighborhood of 300 p.s.i. It is apparent that as long as fuel extrusion is desired to continue, the nitrogen pressure must be greater than the combustion chamber pressure in order to overcome the back pressure from the combustion chamber on the fuel.

It will, of course, be understood that the thrust regulator calibrated spring 33 may either be permanently adjusted by manual means before firing the rocket in order to maintain a fixed predetermined value of thrust, or that any suitable remotely controlled actuating means may be provided to actuate a plunger 33a so as to vary the adjustment of the spring 33 to produce a programmed variation of thrust during the flight of the rocket. If, for example, it is desired to entirely stop combustion or reduce thrust to zero, it is only necessary to reduce the setting of the thrust regulator to a value less than the minimum value of combustion chamber pressure necessary to support combustion of the fuel. In this respect, it will be understood that most mono-propellant fuels of the type described above, have a relatively high burning rate and that this total burning rate is in part determined by the total surface area of the fuel exposed for burning by the fuel splitters 17 which form the conical surface of the fuel in the burner tubes 16. If the rate of fuel extrusion is reduced to the where the conical surfaces are burned away so that only the flat circular cross-sectional surface of fuel in each burner tube remains, combustion chamber pressure is reduced to a point less than that necessary to support burning of the fuel. A typical value of such necessary minimum combustion chamber pressure for many such fuels is approximately 200 p.s.i. Of course, if desired, this reduction in combustion chamber pressure could also be achieved upon a remote command by providing a blow-out valve or other pressure relief means in the combustion chamber downstream of the burner tubes. Such additional means is, however, not in general necessary.

For any given setting of the adjustable thrust regulator spring 33, either a fixed or programmed variable setting, the control system shown in FIGURE 1 acts as a servo-system to maintain the combustion chamber pressure at the desired value independently of changes in the nitrogen supply pressure from tank 19 during the course of operation. Thus, assuming that immediately after the cartridge fired shut-off valve 23 is opened, the system establishes the predetermined desired combustion chamber pressure in accordance with the mode of operation discussed above for the initial value of nitrogen pressure. Then, as the nitrogen pressure begins to decrease, the rate of fuel extrusion will also tend to decrease. This in turn tends to decrease the combustion chamber pressure thereby permitting the diaphragm 32 to move to the left and thus tending to further open the valve 41 so as to compensate for the fall in pressure in tank 19 and thereby increase the pressure on the plunger 13 to its original value. Of course, it will be understood that the original value of the pressure on plunger 13 is less than either the initial or final value of pressure in tank 19 but is greater than the desired pressure in combustion chamber 15 in order to overcome the back pressure therefrom. The desired difference in value between the nitrogen pressure acting on the plunger 13 and the nitrogen pressure existing in tank 19 is maintained by varying the pressure drop through valve 41 in the manner described above.

Figure 2:
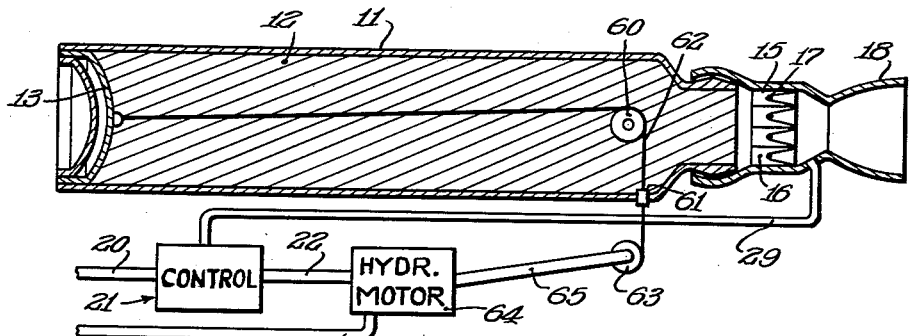
FIGURE 2 is a diagrammatic view partly sectional of a rocket engine thrust control system in accordance with a second embodiment of the invention.

Turning now to FIGURE 2, there is shown a similar rocket in which the plunger 13 is drawn toward the combustion chamber to extrude fuel 12 by means of a hydraulically actuated pulley and winch system. It will be noted that the fuel tank 11 as shown in FIGURE 2 has provided therein a pulley 60 wihch is mounted on an axle extending transversely of the interior of the tank 11. The fuel tank 11 is also provided with a sealed pulley belt outlet 61 through which the belt 62 enters the fuel tank. Belt 62 is attached to plunger 13 on the forward side thereof and is trained over the pulley 60 and thence through the sealed opening 61 in the side of the tank to extend in operative wound relationship around a winch 63.

Winch 63 is driven by a hydraulic motor 64 which may be any type of motor wherein the speed of rotation of the output shaft is proportional to the pressure of hydraulic fluid applied through input line 22 to drive the hydraulic motor 64. Hydraulic motor 64 may, for example, be of the type shown in U.S. Patent No. 2,779,296, issued on January 29, 1957, to Edward C. Dudley.

The hydraulic motor 64 is connected by a belt or any other suitable mechanical drive means 65 to drive the winch 63 at a speed proportional to the speed of rotation of the output shaft of the motor. As noted above, hydraulic fluid for operating the motor 64 is supplied through an input line 22 and a return line 22a from a control unit 21. The control unit 21 may be structurally the same as the control unit 21 shown for the nitrogen supply system of FIGURE 1. The control unit is therefore shown in FIGURE 2 only in block form.

It will be noted in particular that hydraulic fluid under suitable pressure may be supplied from the missile hydraulic supply system or any other convenient source through an input line 20 leading to the control unit 21. It will, of course, be understood that as in the system of FIGURE 1, the line 20 will lead to a control valve such as the control valve 41 shown in FIGURE 1. The control valve is regulated as to the pressure drop thereacross in response to the pressure existing in combustion chamber 15 by means of comparison directly with this pressure communicated through line 29 to the control system 21 as in FIGURE 1. The same type of spring biased bellows arrangement would be used to control the valve controlling the pressure drop of the hydraulic fluid through line 20. The output line 22 from the control unit in the system of FIGURE 2, instead of applying nitrogen gas directly to the plunger as in FIGURE 1, applies the hydraulic fluid of controlled pressure to the hydraulic motor 64. This fluid after operating the motor is returned through a hydraulic fluid return line 22a back to the missile supply source.

It will be apparent that the system of FIGURE 2 operates on principles entirely analogous to that of the system of FIGURE 1. The control of the pressure of the hydraulic fluid through lines 20 and 22 in response to combustion chamber pressure in turn controls the speed of operation of the hydraulic motor driving the winch and therefore determining the speed with which the plunger 13 is pulled toward the combustion chamber by belt 62 riding on the pulley 60. This, of course, in turn controls the burning rate of the fuel and hence the combustion chamber pressure. In applications where the missile is already equipped with a suitable source of hydraulic pressurized fluid, the system shown in FIGURE 2 is somewhat more economical and simpler than the system shown in FIGURE 1.

Figure 3:
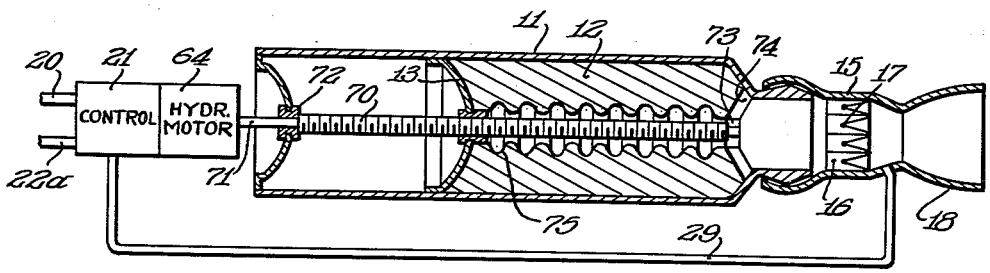
FIGURE 3 is a diagrammatic view partly sectional of a rocket engine thrust control system in accordance with a third embodiment of the invention.

In FIGURE 3 there is shown another hydraulically operated system wherein the plunger 13 in fuel tank 11 is directly driven by a screw jack 70 which in turn is driven by a shaft 71 connected to hydraulic motor 64. The screw jack 70 may be centrally mounted to extend longitudinally of tank 11 between any suitable journaling means 72 at the one end of the tank and a journaling means 73 supported by a spider arrangement 74 in the outlet of the fuel tank leading to the combustion chamber 15. A boot seal 75 may be provided around the screw jack 70 between the plunger 13 and the journaling means 73 in order to isolate the fuel 12 from the other side of the plunger.

As in the arrangement shown in FIGURE 2, the hydraulic motor 64 may be operated from any convenient source of pressurized hydraulic fluid such as an auxiliary power unit or the missile's hydraulic fluid supply so as to apply hydraulic fluid through an input line 20 leading to control unit 21 which may be the same as that shown and described in connection with FIGURE 2. The control unit 21 regulates the speed of motor 64 in a servo system responsive to the pressure in the combustion chamber through line 29. The hydraulic fluid, after leaving the motor, is returned to the missile system through return line 22a. Since the principles of operation of the system of FIGURE 3 are essentialy the same as those discussed for the other embodiments above, it is not believed necessary to discuss the operation in further detail.

Any one of the embodiments shown above provides a dependable system for controlling either to a fixed level or to a modulated level, the thrust of a rocket engine adapted to burn a gelatinous mono-propellant fuel extruded into a combustion chamber. Each of the systems affords zero sensitivity to initial propellant temperature and allow for the possibility of thrust modulation for the well-known boost-coast technique; also each of the systems affords an efficient servo control of rocket thrust responsive to combustion chamber pressure to accelerate or decelerate gel fuel flow as required to reach a predetermined equilibrium operating condition. Each of the systems is such that it is not impeded by back pressures developed in the combustion chambers and will afford stable operating performance. The selection between the various systems shown is, of course, based on the particular type of application for which the rocket engine is intended.

While a particular exemplary preferred embodiment of the invention has been described in detail above, it will be understood that modifications and variations therein may be effected without departing from the true spirit and scope of the novel concepts of the present invention as defined by the following claims.

I claim as my invention:

1. Apparatus for controlling the thrust of a rocket engine of the type having a combustion chamber and an exhaust nozzle comprising, a source of fuel for said engine, hydraulically actuated drive means to feed said fuel to said combustion chamber, a source of hydraulic fluid connected to actuate said drive means, calibrated means to establish a preselected desired value of combustion chamber pressure corresponding to a desired value of thrust of said rocket, means to compare actual combustion chamber pressure and the pressure of the hydraulic fluid actuating said drive means with said preselected desired value, and means connected to be responsive to the difference between said preselected desired combustion chamber pressure and the actual combustion chamber pressure along with the pressure of the hydraulic fluid actuating said drive means to variably control the pressure of said hydraulic fluid supplied to the drive means so as to control the rate of fuel feed to said combustion chamber to reduce said difference to zero to maintain said rocket thrust at said predetermined value.

2. Apparatus for controlling the thrust of a gelatinous mono-propellant fueled rocket engine of the type having a combustion chamber and an exhaust nozzle comprising, a fuel tank adapted to contain said gelatinous mono-propellant fuel, said fuel tank communicating at one end with said combustion chamber, plunger drive means slidably mounted in sealed relation with said fuel tank for axial movement therein to extrude said gelatinous fuel to said combustion chamber, a pulley mounted in said fuel tank, a winch, belt means connected to said plunger drive means and trained over said pulley to said winch, a sealed opening in the side of said tank to accommodate said belt means connected between said pulley and said winch, a hydraulic motor connected to drive said winch to actuate said plunger drive means through said belt, means to supply pressurized hydraulic fluid to said motor, calibrated means to establish a preselected desired value of combustion chamber pressure corresponding to a desired value of thrust of said rocket, means to compare actual combustion chamber pressure and the pressure of the hydraulic fluid supplied to said motor with said preselected desired value, and means connected to be responsive to the difference between the preselected desired combustion chamber pressure and the actual combustion chamber pressure along with the pressure of the hydraulic fluid supplied to said hydraulic motor to control the pressure of hydraulic fluid supplied to said hydraulic motor so as to control the speed at which said winch drives said plunger means and hence the rate at which said plunger means extrudes said fuel to said combustion chamber so as to reduce the difference in pressure values to zero to maintain said rocket thrust at said preselected value.

3. Apparatus for controlling the thrust of a gelatinous mono-propellant fueled rocket engine of the type having a combustion chamber and an exhaust nozzle comprising, a fuel tank adapted to contain said gelatinous mono-propellant fuel, said fuel tank communicating at one end with said combustion chamber, plunger drive means slidably mounted in sealed relation with said fuel tank for axial movement therein to extrude said gelatinous fuel to said combustion chamber, a screw jack mounted axially within said fuel tank, said plunger drive means being connected to be moved by rotation of said jack, a hydraulic motor connected to rotate said screw jack, means to supply hydraulic fluid under pressure to operate said motor, calibrated means to establish a preselected desired value of combustion chamber pressure corresponding to a desired value of thrust of said rocket, means to compare actual combustion chamber pressure and the pressure of hydraulic fluid supplied to operate said motor with said preselected desired value, and valve means positioned to control the pressure of said hydraulic fluid supplied to said motor and connected to be responsive to the difference between said preselected desired value of combustion chamber pressure and the actual value of combustion chamber pressure along with the pressure of said hydraulic fluid actuating said motor to control the pressure of said hydraulic fluid actuating said motor to drive said screw jack, so as to control the rate of movement of said plunger drive means and hence the rate at which said drive means feeds said fuel to said combustion chamber to reduce said difference of values to zero and to maintain said rocket thrust at said preselected value.

4. Apparatus for controlling the thrust of a gelatinous mono-propellant fueled rocket engine of the type having a combustion chamber and an exhaust nozzle comprising, a fuel tank adapted to contain said gelatinous mono-propellant fuel, said fuel tank communicating at one end with said combustion chamber, plunger drive means slidably mounted in sealed relation with said fuel tank for axial movement therein to extrude said gelatinous fuel to said combustion chamber, hydraulically actuated means connected to move said plunger drive means at a rate proportional to the pressure of hydraulic fluid supplied thereto, a source of hydraulic fluid connected to said hydraulic drive means through a control valve, a diaphragm biased on one side by calibrated spring means to establish a preselected desired value of combustion chamber pressure corresponding to a desired value of thrust of said rocket, means comprising a conduit connecting the other side of said diaphragm to said combustion chamber to compare actual combustion chamber pressure with said preselected value, said control valve being positioned to control the pressure of said hydraulic fluid and being connected to be actuated by said diaphragm to be responsive to the difference between said preselected value of combustion chamber pressure and the actual value of combustion chamber pressure to control the pressure of said inert gas supplied to said drive means and hence the rate at which said drive means feeds said fuel to said combustion chamber so as to reduce said difference to zero to maintain said rocket thrust at said preselected value.

5. Apparatus for controlling the thrust of a rocket engine of the type having a combustion chamber and an exhaust nozzle comprising, a source of fuel for said engine, drive means to feed said fuel to said combustion chamber, actuation means to actuate said drive means, means for metering the amount of actuation by said actuation means, and means for controlling said metering means including means responsive to the combustion pressure in said combustion chamber and means responsive to the amount of actuation by said actuation means, said means responsive to the combustion pressure in said combustion chamber controlling said means responsive to the amount of actuation by said actuation means whereby to provide an amount of actuation by the actuation means to said drive means such as to maintain said combustion pressure at a desired value and to produce a desired thrust for said rocket and calibrating means for said metering means to select the desired value.

6. Apparatus for controlling the thrust of a rocket engine of the type having a combustion chamber and an exhaust nozzle comprising, a source of fuel for said engine, fluid actuated drive means to feed said fuel to said combustion chamber, a source of fluid connected to supply fluid under pressure to said drive means, means for metering the fluid supplied to said drive means and means for controlling said metering means including means responsive to the combustion pressure in said combustion chamber and means responsive to the pressure of said fluid, said means responsive to the combustion pressure in said combustion chamber controlling said means responsive to the pressure of said fluid to position said metering means to provide an amount of fluid under pressure to actuate said drive means such as to maintain said combustion pressure at a desired value and to produce a desired thrust for said rocket and calibrating means for said metering means to select the desired value.

7. Apparatus for controlling the thrust of a gelatinous mono-propellant fueled rocket engine of the type having a combustion chamber and an exhaust nozzle comprising, a fuel tank adapted to contain said gelatinous mono-propellant fuel, said fuel tank communicating at one end with said combustion chamber, plunger drive means slidably mounted in sealed relation with said fuel tank for axial movement therein to extrude said gelatinous fuel to said combustion chamber, actuation means to actuate said drive means, calibrating means providing a force corresponding to a desired value of combustion chamber pressure and to a desired value of thrust of said rocket, means for metering the amount of actuation by said actuation means, and means for controlling said metering means including means responsive to the combustion pressure in said combustion chamber and the force of said calibrating means to provide a first differential force and means responsive to the amount of actuation by said actuation means and the first differential force to provide a second differential force which positions said metering means to provide an amount of actuation of said actuation means to said drive means such as to maintain said combustion pressure at said desired value and to produce said desired thrust for said rocket.

8. Apparatus for controlling the thrust of a gelatinous mono-propellant fueled rocket engine of the type having a combustion chamber and an exhaust nozzle comprising, a fuel tank adapted to contain said gelatinous mono-propellant fuel, said fuel tank communicating at one end with said combustion chamber, plunger drive means slidably mounted in sealed relation with said fuel tank for axial movement therein to extrude said gelatinous fuel to said combustion chamber, means to supply an inert pressurized gas to actuate said drive means, a diaphragm biased on one side by calibrated spring means to establish pre-selected values of combustion chamber pressure corresponding to the desired value of thrust of said rocket, a conduit connecting the other side of said diaphragm to said combustion chamber, valve means positioned to control the flow of said pressurized inert gas supply to said plunger drive means, means responsive to the pressure of said pressurized inert gas supply connected to said valve means, and means transmitting force between said means responsive to the pressure of said pressurized inert gas supply and said diaphragm in each direction whereby to control the position of said valve means and hence the flow of said pressurized inert gas supply to maintain said combustion chamber pressure at said pre-selected value and to maintain said rocket thrust at said desired value.

References Cited in the file of this patent
UNITED STATES PATENTS

| | | |
|---|---|---|
| 2,703,960 | Prentiss | Mar. 15, 1953 |
| 2,816,419 | Mueller | Dec. 17, 1957 |
| 3,046,736 | Thomson | July 31, 1962 |

FOREIGN PATENTS

| | | |
|---|---|---|
| 582,1016 | Great Britain | Nov. 22, 1946 |

OTHER REFERENCES

Astronautics publication, February 1958, pages 34 and 35 relied on.

Rocket Propulsion Elements by Sutton, 2nd edition, 1956, published by John Wiley & Sons, Inc., pages 297–299 relied on.